(No Model.)
C. C. MILLER.
CLAMP FOR TESTING MACHINES.
No. 517,356. Patented Mar. 27, 1894.
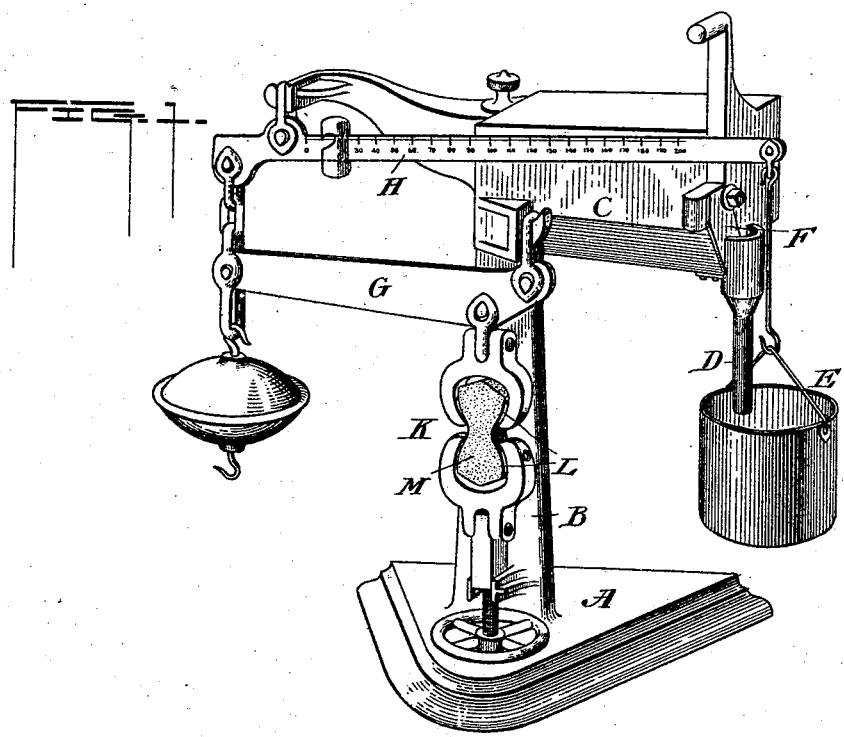
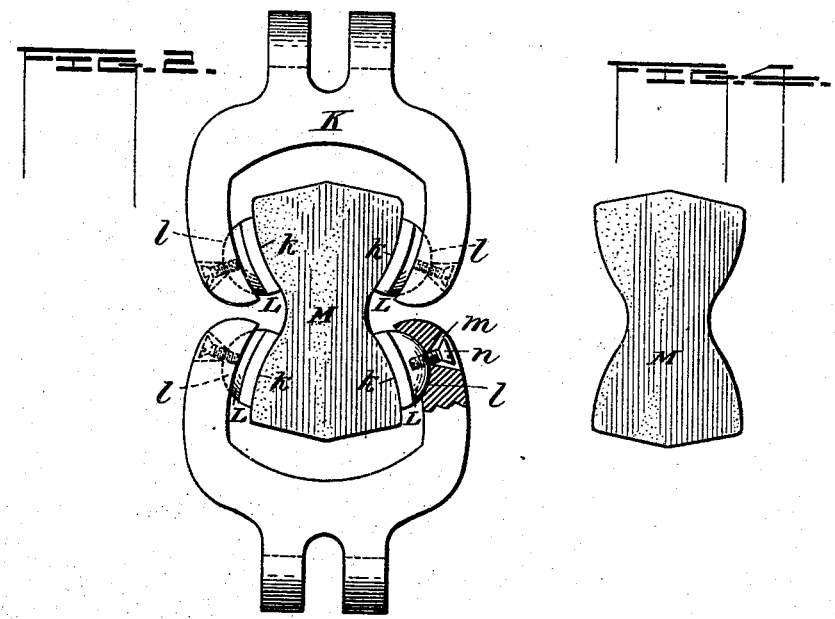
Witnesses
Inventor
Charles C. Miller
by Chas S. Sturtevant,
his Attorney

UNITED STATES PATENT OFFICE.

CHARLES C. MILLER, OF NEW YORK, N. Y.

CLAMP FOR TESTING-MACHINES.

SPECIFICATION forming part of Letters Patent No. 517,356, dated March 27, 1894.

Application filed May 31, 1893. Serial No. 476,004. (No model.)

*To all whom it may concern:*

Be it known that I, CHARLES C. MILLER, a citizen of the United States, residing at New York, in the county of New York and State of New York, have invented certain new and useful Improvements in Testing-Machines, of which the following is a description, reference being had to the accompanying drawings, and to the letters of reference marked thereon.

My invention relates to an improvement in machines for testing the tensile strength of hydraulic cement, it being the custom to mix the cement with water and then pack it in molds made for the purpose, thus making what is known as the "standard briquet." When this specimen is sufficiently hardened, it is placed in the testing machine and broken to ascertain the tensile strength per square inch.

The testing machine upon which my present invention is an improvement is illustrated in Patent No. 313,607, granted to myself March 10, 1885, and comprises clamps for holding the specimen, one clamp connected to a system of coupled straining levers, the terminal lever being provided with a removable weight pan into which the shot from a reservoir is permitted to flow until the weight is sufficient to break the specimen, said terminal lever being graduated to serve as a scale beam and being provided with a movable poise so that when an amount of shot sufficient to break the briquet has run into the pan, said pan can be removed from the straining end of the lever to the graduated end, and by moving the poise the actual weight which broke the specimen can be determined. In these testing machines as heretofore constructed, the holding clamps are made to fit the mold in which the briquet is made, and, therefore, when said briquet is first molded it fits exactly in the clamps, but after thoroughly drying it is likely to change its shape by warping or bulging so that it is not an exact fit, and the result is that when the briquet is broken under the strain it may yield, not directly across the center, but is liable to be slivered or broken at the end, thus entirely destroying the result of the test. I have found that this defect can be obviated by making the holding clamps so that they will accommodate themselves to any irregularities in the surface of the specimen, and my object, therefore, is to provide a clamp of such construction that it will fit the surface of said specimen even though it be slightly uneven.

The invention, therefore, consists primarily of a clamp for testing machines having movable bearing faces adapted to grasp the briquet, and also in certain details for attaching said bearing faces.

In the accompanying drawings which illustrate the invention Figure 1 represents a perspective view of a testing machine embodying my invention. Fig. 2 is a side view showing the clamps in detail. Fig. 3 is a sectional view of one arm of the same; showing the manner of securing and pivoting the bearing faces; and Fig. 4 is a plan view of the standard briquet.

Referring to Fig. 1, the main portion of the machine and the action thereof are like that shown in my prior patent above mentioned, in which A is the base, B the vertical standard supporting the shot hopper C, having a brass tube D to conduct the shot into the receptacle E when the valve F is opened, this valve being automatically closed when the briquet breaks.

G is the main weighing beam and H the graduated beam having a sliding poise thereon.

The clamp which forms the feature of this case is shown at K, there being two of them secured as in the aforesaid patent. To carry out the purpose of the invention, each clamp is similar in form to that now in use, but is made enough larger to allow for the attachment of gripping surfaces as L. The pieces may be made of any suitable material, preferably of metal like the body of the clamp, with outer faces $k, k$, having a contour substantially that of the edges of the briquet, and having round or ball joint backs, $l, l$, fitting sockets formed near the ends of the clamp, whereby slight moving of the gripping surface in any direction is permitted. The bearing faces of the gripping pieces may be covered with leather or other soft material if desired, to increase the contact and act as a cushion. Any suitable means of securing the gripping surfaces to the clamps may be employed, but as a convenient means of so doing, I use the construction shown in Fig. 3 in which a tapering hole $m$ is made through the clamp, a screw *n* being passed therethrough and attached to the gripping piece. The head of the screw is preferably smaller than the tapering hole in which it is countersunk and the diameter of the screw is less than that of the hole at its narrowest point so that the gripping piece is permitted slight universal movement by means of its rounded back and the supporting screw *n*. It will be obvious that any kind of joint may be provided between the gripping surface and the body of the clamp so long as it is permitted movement sufficient to allow it to accommodate itself to any inequalities in the surface of the briquet so as to exactly fit the same.

Various other changes and modifications in the construction of the parts may be devised without departing from the spirit of the invention.

Having thus described my invention, what I claim as new, and desire to secure by Letters Patent, is—

1. A clamp for testing machines comprising a yoke having inwardly turned ends provided with rounded sockets, a gripping block for each end, its inner face fitting within said socket and its outer face conforming to the shape of a standard briquet and adapted to directly engage the same, and means for securing each gripping block within its socket; substantially as described.

2. A clamp for testing machines comprising a yoke having its ends provided with rounded sockets, a gripping block for each end having its outer face conforming to the contour of a standard briquet, its inner face being rounded to fit its socket, and a screw passing through each end into the rounded face of the gripping block; substantially as described.

3. A clamp for use in testing machines having inwardly turned ends with sockets therein, a tapering hole extending through each of said ends, a hemispherical block fitting in each of said sockets and on its outer face adapted to engage a standard briquet, and a screw passing through said tapering hole into the block and of less diameter than said tapering hole; substantially as described.

In testimony whereof I affix my signature in presence of two witnesses.

CHARLES C. MILLER.

Witnesses:
M. C. G. WITTE,
ALEX G. VAN CLEVE.